US007924873B2

(12) United States Patent
Richter et al.

(10) Patent No.: US 7,924,873 B2
(45) Date of Patent: Apr. 12, 2011

(54) DYNAMIC TRANSLATIONAL TOPOLOGY LAYER FOR ENABLING CONNECTIVITY FOR PROTOCOL AWARE APPLICATIONS

(75) Inventors: Andrew H. Richter, Chapel Hill, NC (US); Belinda L. Thompson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 11/189,519

(22) Filed: Jul. 26, 2005

(65) Prior Publication Data

US 2007/0041400 A1    Feb. 22, 2007

(51) Int. Cl.
*H04J 3/16* (2006.01)
*H04J 3/22* (2006.01)
*H04L 12/28* (2006.01)
*H04L 12/56* (2006.01)
*H04B 3/30* (2006.01)

(52) U.S. Cl. .................. 370/466; 370/285; 370/401
(58) Field of Classification Search .............. 370/465, 370/466
See application file for complete search history.

(56) References Cited

U.S. PATENT DOCUMENTS

| | | | | |
|---|---|---|---|---|
| 4,803,485 | A * | 2/1989 | Rypinski | 370/452 |
| 5,721,876 | A | 2/1998 | Yu et al. | |
| 5,732,071 | A * | 3/1998 | Saito et al. | 370/255 |
| 6,047,002 | A * | 4/2000 | Hartmann et al. | 370/466 |
| 6,741,610 | B1 * | 5/2004 | Volftsun et al. | 370/466 |
| 6,785,730 | B1 | 8/2004 | Taylor | |
| 2003/0189920 | A1 * | 10/2003 | Erami et al. | 370/351 |
| 2003/0202535 | A1 * | 10/2003 | Foster et al. | 370/469 |
| 2003/0231632 | A1 * | 12/2003 | Haeberlen | 370/395.5 |
| 2004/0229608 | A1 * | 11/2004 | Isukapalli et al. | 455/432.1 |
| 2005/0002417 | A1 * | 1/2005 | Kelly et al. | 370/466 |
| 2007/0286233 | A1 * | 12/2007 | Latif et al. | 370/466 |

OTHER PUBLICATIONS

Black, Richard, et al, *Experience and Results from the Implementation of an ATM Socket Family*; Oct. 27, 1993, pp. 8-1-8-11.

* cited by examiner

*Primary Examiner* — Ayaz R Sheikh
*Assistant Examiner* — Blanche Wong
(74) *Attorney, Agent, or Firm* — Steven M. Greenberg, Esq.; Carey Rodriguez Greenberg Paul, LLP

(57) ABSTRACT

A method for enabling connectivity for protocol aware applications across different network topologies can include receiving frames passing between a first network having a first network topology and a second network having a second network topology; inspecting an incoming one of the frames to identify a remote resource in the second network and a device identifier corresponding to the remote resource, and an outgoing one of the frames to identify a socket assigned to a local resource in the first network and a device identifier for the local resource corresponding to the socket; and, transmitting data from a protocol-aware application in the first network to the remote resource in the second network in a protocol consistent with the second network topology, and further transmitting data from the remote resource in the second network to the protocol-aware application in the first network in a protocol consistent with the first network topology.

14 Claims, 2 Drawing Sheets

US 7,924,873 B2

DYNAMIC TRANSLATIONAL TOPOLOGY LAYER FOR ENABLING CONNECTIVITY FOR PROTOCOL AWARE APPLICATIONS

BACKGROUND OF THE INVENTION

1. Field of the Invention

The present invention relates to protocol aware applications and more particularly to enabling connectivity for protocol aware applications.

2. Description of the Related Art

Protocol aware applications are applications which are configured for operation in a computing environment utilizing a specific communications protocol for exchanging information. In the prototypical example, a protocol aware application is one that communicates with resources and other applications in a computing environment using a pre-established communications protocol. In consequence, a tight coupling can be achieved between the application and low level communications services in the computing environment. In this regard, data exchanged between remote connections can be formatted specifically for the known protocol according to the program code of the application.

Protocol aware applications thrived for years in the pre-Internet era of the sessions based inter-process communications of which the Systems Network Architecture (SNA) is representative. In SNA, clusters of computing resources can be communicatively linked for interoperability utilizing token ring network technologies. A protocol-aware application common in SNA included a network control program (NCP) configured to route data according to the token ring protocol. Notwithstanding, the advent of the Internet and the adoption of Ethernet and the transport control protocol/Internet protocol (TCP/IP) has given rise to a need to adapt legacy protocol aware applications to new protocols for different topologies.

It is desirable, however, to adapt protocol aware applications to new computing topologies without necessitating wholesale modifications to the protocol aware applications so as to preserve existing investments in computing technologies. For example, routing applications for legacy mainframe systems maintain a close awareness of the underlying network topology in which the mainframe systems operate. Yet, as legacy mainframe systems are incorporated in modern, TCP/IP network environments, it remains desirable to leverage existing, protocol aware applications like routing applications without requiring a complete recoding of the routing applications. In this way, the routing applications can account for the different network topologies communicatively coupled to the routing applications without experiencing a complete recoding.

BRIEF SUMMARY OF THE INVENTION

Embodiments of the present invention address deficiencies of the art in respect to protocol-aware applications and provide a novel and non-obvious method, system and computer program product for enabling connectivity for protocol aware applications across different network topologies. In one embodiment, a system for enabling connectivity for protocol-aware applications across different network topologies can include a network device handler (NDH) configured for coupling to a protocol-aware application configured for operation in a first network having a first network topology, and a network device communicatively linked to a second network having a second, different network topology. The system also can include first and second mappings.

The first mapping can include a mapping of devices for remote resources in the second network to the remote resources. To facilitate the mapping, a link layer address can be used to identify the devices, for example, a media access control (MAC) address. The second mapping can include a mapping of link layer addresses for local resources to sockets for the local resources. Other non-link layer means are available for the first and second mappings including mapping a channel control identifer (CCID) in an Open System Architecture (OSA) design to a socket and mapping each socket to a input/output (QDIO) device where the NDH converts QDIO frames to the channel data link control (CDLC) format.

In any event, the NDH can include program code enabled to utilize the second mapping to receive data from the protocol-aware application for transmission through the network device to selected remote resources in the second network in a protocol consistent with the first network topology. Likewise, the NDH further can include program code enabled to utilize the first mapping to receive data from the remote resources in the second network through the network device for transmission to the protocol-aware application in a protocol consistent with the first network topology.

Optionally, the NDH can be disposed in an operating system kernel in a host computing platform. Alternatively, the NDH can be disposed in an operating system kernel in a logical partition in a host computing platform. In either case, the first network topology can be a ring topology utilizing the Token Ring protocol, while the second network topology can be a bus topology utilizing the Ethernet protocol. Finally, the NDH can be configured for coupling to multiple protocol-aware applications. Each of the protocol-aware applications can be configured for operation in the first network having the first network topology.

In a second embodiment, a method for enabling connectivity for protocol aware applications across different network topologies can include receiving frames passing between a first network having a first network topology and a second network having a second network topology. The method further can include inspecting an incoming one of the frames to identify a remote resource in the second network and a device identifier corresponding to the remote resource, and an outgoing one of the frames to identify a socket assigned to a local resource in the first network and a identifier for the local resource corresponding to the socket. Finally, the method can include transmitting data from a protocol-aware application in the first network to the remote resource in the second network in a protocol consistent with the second network topology, and further transmitting data from the remote resource in the second network to the protocol-aware application in the first network in a protocol consistent with the first network topology.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for enabling connectivity for protocol aware applications. In accordance with an embodiment of the present invention, a network device handler can be coupled to one or more networks having one or more different network topologies. The network device handler can identify from incoming and outgoing frames the device identifier for remote nodes and local nodes, respectively. The network device handler further can identify from the incoming and outgoing frames the real device associated with each device identifier for each remote node, and also the socket associated with each device identifier for each local node. Subsequently, the network device handler can properly route data traffic between communicatively coupled, protocol aware applications and the remote nodes without requiring a code change in the protocol aware applications.

Figure 1:
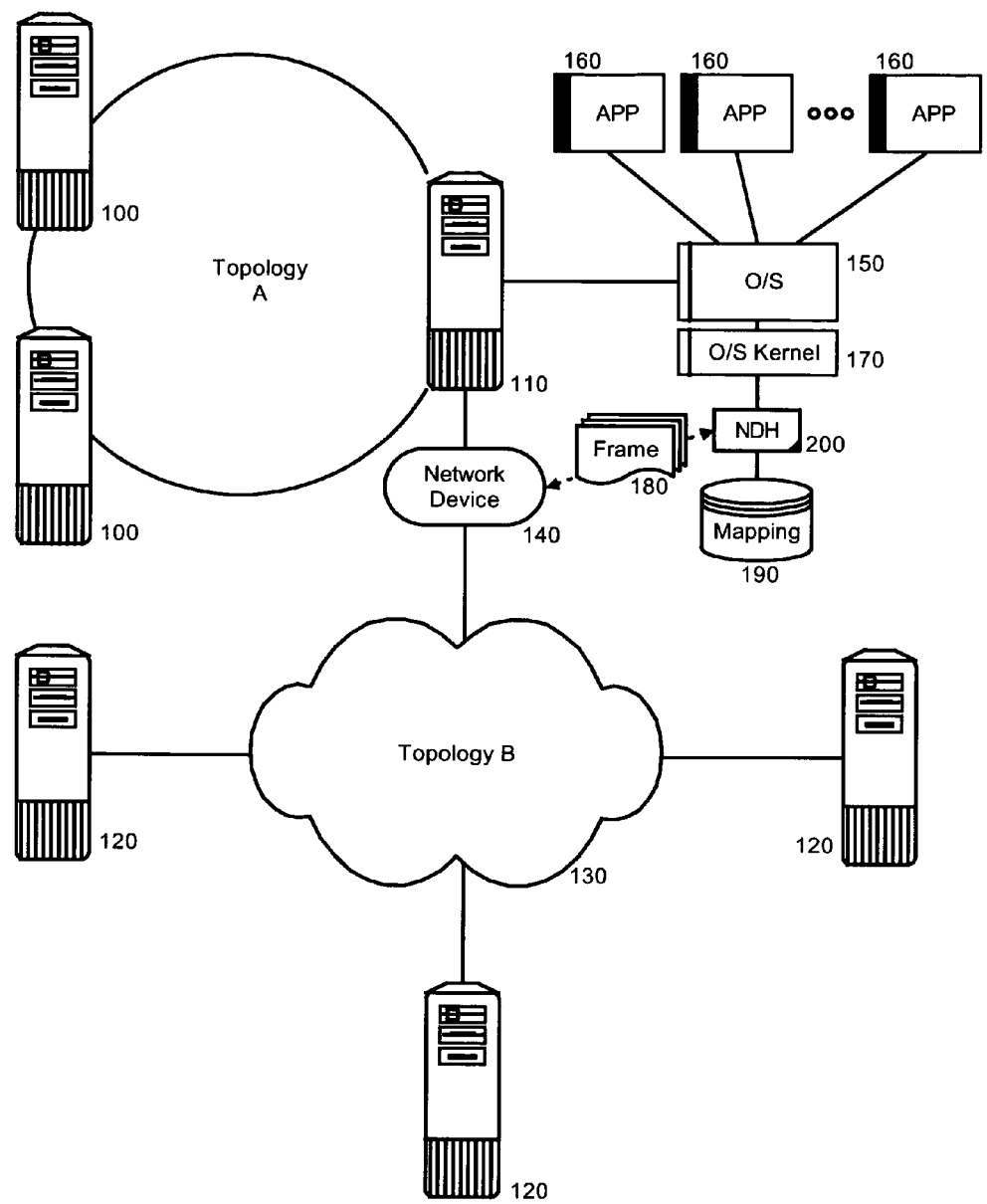
FIG. 1 is a schematic illustration of a system for enabling connectivity for protocol aware applications across different network topologies; and, FIG. 2 is a flow chart illustrating a process for enabling connectivity for protocol aware applications across different network topologies.

In further illustration of an embodiment of the invention, FIG. 1 is a schematic illustration of a system for enabling connectivity for protocol aware applications across different network topologies. As shown in FIG. 1, a host computing platform 110, such as a server or logical partition, can be coupled to other computing platforms 100 in a first network having a first network topology such as the token ring network topology. The host computing platform 110 can include an operating system 150 having an operating system kernel 170. One or more protocol-aware applications 160 can execute in the operating system 150 and can share data and access resources in the other computing platforms 100 in the first network.

Notably, the host computing platform 110 can include a network adapter or network device 140 through which the host computing platform 110 can be coupled to other computing platforms 120 in a different, second network 130 having a different, second network topology. To enable inter-enterprise networking between both disparate networks, the host computing platform 110 can include an NDH 200 and a set of mappings 190. Both the NDH 200 and the set of mappings can enable the sharing of data with the second network 130 without requiring modifications to the protocol-aware applications 160.

Specifically, the NDH 200 can be configured to register with the host computing platform 110 to receive frames 180 passing through the network device 140. The NDH 200 can inspect incoming ones of the frames 180 to identify available remote resources in the second network 130 and corresponding device identifiers for the available remote resources, such as a link layer address for the available remote resources including a MAC address. Additionally, the NDH 200 can inspect outgoing ones of the frames 180 to identify local resources in the first network and corresponding device identifiers for the local resources. Furthermore, assigned sockets associated with the local resources can be identified. As the NDH 200 identifies pairs of available resources and corresponding device identifiers a mapping 190 of the pairs can be updated. Likewise, as the NDH 200 identifies pairs of local resources and assigned sockets a mapping 190 of the pairs can be updated.

The NDH 200 can provide a direct socket application programming interface for the protocol-aware applications 160 through which the protocol-aware applications 160 can connect to receive frames 180 in a protocol consistent with the first network topology. In this regard, utilizing the updated mappings 190, the NDH 200 can translate incoming frames 180 from a protocol consistent with the network topology of the second network 130 into a protocol recognized by the protocol-aware applications 160 which can be consistent with the network topology of the first network. Similarly, the NDH 200 can translate outgoing frames 180 from a protocol recognized by the protocol-aware applications 160 which can be consistent with the network topology of the first network, into a protocol consistent with the network topology of the second network 130. In this way, the protocol-aware applications 160 can interoperate with remote resources in the second network 130 without requiring wholesale modifications to the protocol-aware applications 160.

Figure 2:
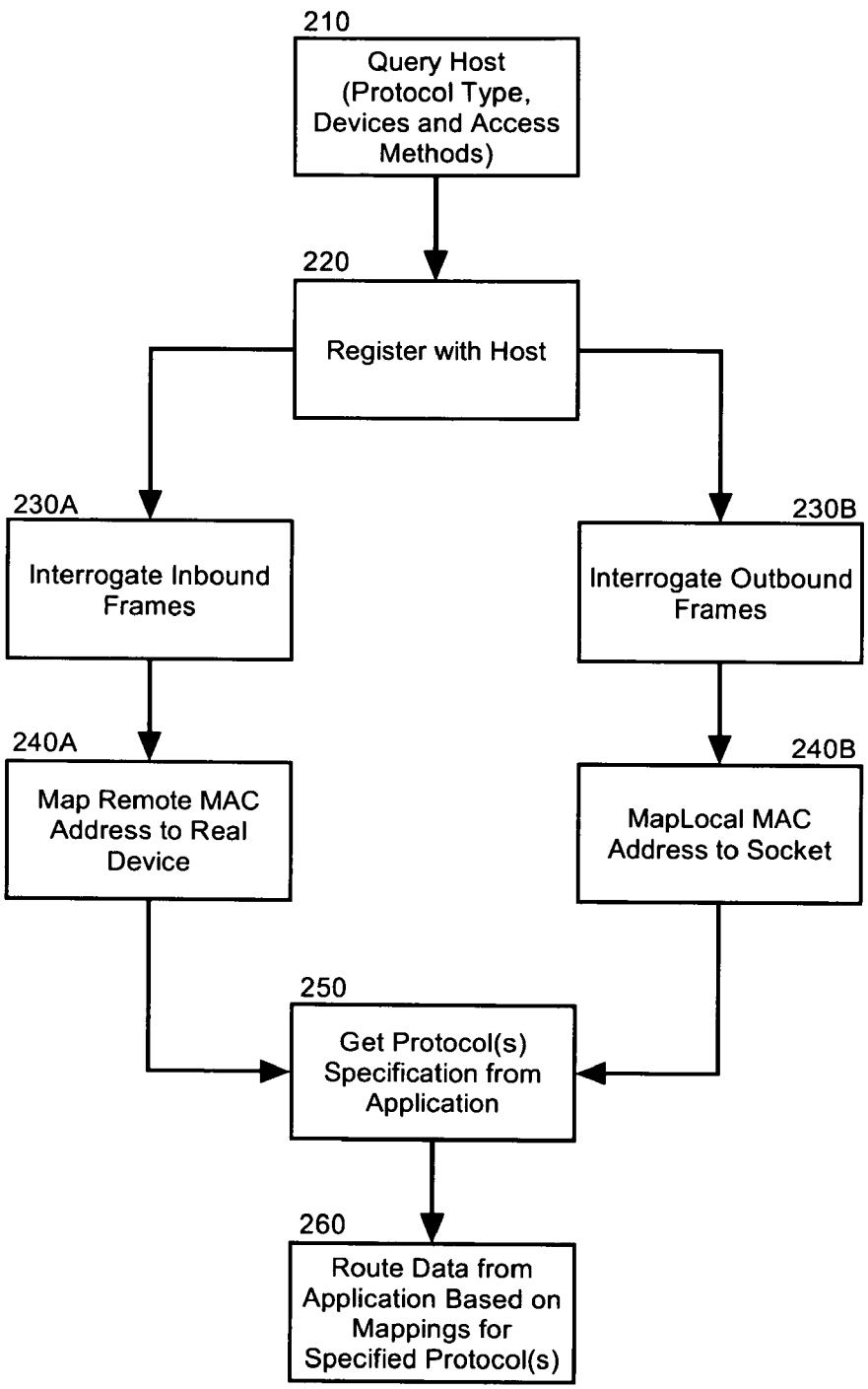

In more particular illustration, FIG. 2 is a flow chart illustrating a process for enabling connectivity for protocol aware applications across different network topologies. Beginning in block 210, the host computing platform can be queried to determine the number, protocol type and access methods for all locally available resources. In block 220, a registration process within the host platform can be invoked in order to receive a copy of every frame received over the available devices. In block 230A, inbound frames can be interrogated to produce a remote MAC address to remote resource table in block 240A to facilitate routing of outbound frames. Likewise, in block 230B, outbound frames can be interrogated to produce a local MAC address to socket assigned to local resource table in block 240B to facilitate routing of inbound frames to a proper socket.

In block 250, a network protocol specification can be received from a protocol-aware application. Subsequently, in block 260 inbound frames can be translated into the specified protocol and routed to the proper socket. Conversely, outbound frames can be translated from the specified protocol and routed to the proper remote resource. Yet, the protocol-aware application can remain unaware of the number and type of real interfaces in the second network and no code changes are required in the protocol-aware applications.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A system for enabling connectivity for protocol-aware applications across different network topologies comprising:
    a host computing hardware platform including a network device handler configured to
        couple to a protocol-aware application configured for operation in a first network having a first network topology, and
        couple to a network device communicatively linked to a second network having a second, different network topology;
    a first mapping comprising a mapping of remote resource identifiers for remote resources in said second network to said remote resources; and
    a second mapping comprising a mapping of local resource identifiers for local resources to sockets for said local resources;
    said network device handler configured to
        utilize said second mapping to receive data from said protocol-aware application for transmission through said network device to selected remote resources in said second network in a protocol consistent with said second network topology; and
        utilize said first mapping to receive data from said remote resources in said second network through said network device for transmission to said protocol-aware application in a protocol consistent with said first network topology.

2. The system of claim 1, wherein said network device handler is disposed in an operating system kernel in the host computing hardware platform.

3. The system of claim 1, wherein said network device handler is disposed in a logical partition in the host computing hardware platform.

4. The system of claim 1, wherein said first network topology is a ring topology.

5. The system of claim 1, wherein said second network topology is a bus topology.

6. The system of claim 1, wherein said local resource identifier are media access control (MAC) addresses.

7. The system of claim 1, wherein said local resource identifier are channel control identifiers (CCID).

8. The system of claim 1, wherein said network device handler is configured to couple to a plurality of protocol-aware applications, and each of the plurality of protocol-aware application are configured to operate in said first network having said first network topology.

9. A method for enabling connectivity for protocol aware applications across different network topologies comprising:
    receiving frames passing between a first network having a first network topology and a second network having a second network topology;
    inspecting an incoming one of said frames to identify a remote resource in said second network and a remote resource identifier corresponding to said remote resource;
    inspecting an outgoing one of said frames to identify a socket assigned to a local resource in said first network and a local resource identifier for said local resource corresponding to said socket;
    transmitting data from a protocol-aware application in said first network to said remote resource in said second network in a protocol consistent with said second network topology; and
    transmitting data from said remote resource in said second network to said protocol-aware application in said first network in a protocol consistent with said first network topology.

10. The method of claim 9, further comprising
    receiving requests from multiple protocol-aware applications in said first network to receive data in a protocol consistent with said first network topology.

11. The method of claim 9, further comprising
    registering with a host computing platform coupled to both said first network and said second network.

12. A computer program product comprising a computer-readable storage medium having computer usable program code stored therein for enabling connectivity for protocol aware applications across different network topologies, said computer usable program code, which when executed by a computer hardware system, causes the computer hardware system to perform
    receiving frames passing between a first network having a first network topology and a second network having a second network topology;
    inspecting an incoming one of said frames to identify a remote resource in said second network and a device identifier corresponding to said remote resource;
    inspecting an outgoing one of said frames to identify a socket assigned to a local resource in said first network and a device identifier for said local resource corresponding to said socket;
    transmitting data from a protocol-aware application in said first network to said remote resource in said second network in a protocol consistent with said second network topology; and
    transmitting data from said remote resource in said second network to said protocol-aware application in said first network in a protocol consistent with said first network topology.

13. The computer program product of claim 12, wherein the computer usable program code further causes the computer hardware system to perform
    receiving requests from multiple protocol-aware applications in said first network to receive data in a protocol consistent with said first network topology.

14. The computer program product of claim 12, wherein the computer usable program code further causes the computer hardware system to perform
    registering with a host computing platform coupled to both said first network and said second network.

* * * * *